US012388867B2

(12) United States Patent
Bahl

(10) Patent No.: US 12,388,867 B2
(45) Date of Patent: Aug. 12, 2025

(54) SYSTEMS AND METHODS FOR IDENTIFYING ELECTRONIC ACCOUNTS BASED ON NEAR REAL TIME MACHINE LEARNING IN AN ELECTRONIC NETWORK

(71) Applicant: BANK OF AMERICA CORPORATION, Charlotte, NC (US)

(72) Inventor: Rajeev Bahl, Bear, DE (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 201 days.

(21) Appl. No.: 18/231,962

(22) Filed: Aug. 9, 2023

(65) Prior Publication Data

US 2025/0055878 A1 Feb. 13, 2025

(51) Int. Cl.
*H04L 9/40* (2022.01)

(52) U.S. Cl.
CPC ........ *H04L 63/1483* (2013.01); *H04L 63/102* (2013.01)

(58) Field of Classification Search
CPC ........................ H04L 63/1483; H04L 63/1433
See application file for complete search history.

(56) References Cited

U.S. PATENT DOCUMENTS 7,089,592 B2 * 8/2006 Adjaoute .............. G06Q 20/04 726/1
7,809,740 B2 * 10/2010 Chung .................. G06Q 30/02 707/758
8,364,627 B2 * 1/2013 Canny .................... G06Q 30/02 706/47
8,438,170 B2 5/2013 Koran
8,458,074 B2 6/2013 Showalter
9,065,850 B1 * 6/2015 Sobrier ............... H04L 63/1483
10,007,927 B2 6/2018 Koran
10,504,126 B2 12/2019 Kulkarni
10,516,906 B2 12/2019 Arpteg
10,979,315 B1 4/2021 Buxton
11,436,293 B2 9/2022 Priness
11,526,754 B2 12/2022 Odibat
11,870,799 B1 * 1/2024 Imrem .................. H04L 63/102
(Continued)

FOREIGN PATENT DOCUMENTS

EP 2963577 A1 * 1/2016 ........... G06F 16/285

*Primary Examiner* — Ponnoreay Pich
(74) *Attorney, Agent, or Firm* — Moore & Van Allen PLLC; Lauren M. Stokes

(57) ABSTRACT

Systems, computer program products, and methods are described herein for systems and methods for identifying electronic accounts based on near real time machine learning in an electronic network. The present disclosure is configured to: identify at least one data storage component associated with an at least one application; determine at least one current requirement of the data; receive at least one data segment from the data storage component; collect at least one current element from at least one data segment; reformat and aggregate the at least one current element and link the at least one current element to a unique entity identifier; apply a trained machine learning model to the at least one current element; generate a new data segment; and generate a propensity score based on at least one of unique entity identifier, at least one current element, or at least one new data segment.

20 Claims, 8 Drawing Sheets

300

IDENTIFY AT LEAST ONE DATA STORAGE COMPONENT, WHEREIN AT LEAST ONE DATA STORAGE COMPONENT COMPRISES DATA ASSOCIATED WITH AN AT LEAST ONE APPLICATION
302

DETERMINE AT LEAST ONE CURRENT REQUIREMENT OF THE DATA, WHEREIN THE AT LEAST ONE CURRENT REQUIREMENT COMPRISES AT LEAST ONE OF AN OBJECTIVE PRIORITY, A DRIVER OF PROPENSITY, OR A PROGRESSION REQUIREMENT
304

RECEIVE AT LEAST ONE DATA SEGMENT FROM THE DATA STORAGE COMPONENT ASSOCIATED WITH THE AT LEAST ONE APPLICATION
306

COLLECT AT LEAST ONE CURRENT ELEMENT FROM THE AT LEAST ONE DATA SEGMENT
308

REFORMAT AND AGGREGATE THE AT LEAST ONE CURRENT ELEMENT AND LINK THE AT LEAST ONE CURRENT ELEMENT TO A UNIQUE ENTITY IDENTIFIER
310

APPLY A TRAINED MACHINE LEARNING MODEL TO THE AT LEAST ONE CURRENT ELEMENT
312

GENERATE, BY THE TRAINED MACHINE LEARNING MODEL A NEW DATA SEGMENT, WHEREIN THE NEW DATA SEGMENT IS BASED ON THE AT LEAST ONE CURRENT ELEMENT OF THE NEW DATA SEGMENT
314

GENERATE A PROPENSITY SCORE BASED ON AT LEAST ONE OF THE UNIQUE ENTITY IDENTIFIER, THE AT LEAST ONE CURRENT ELEMENT, OR THE AT LEAST ONE NEW DATA SEGMENT
316

(56) References Cited

U.S. PATENT DOCUMENTS

| | | | | |
|---|---|---|---|---|
| 2007/0130351 | A1* | 6/2007 | Alperovitch | H04L 63/1425 709/229 |
| 2008/0175266 | A1* | 7/2008 | Alperovitch | H04L 41/0894 370/252 |
| 2010/0115621 | A1* | 5/2010 | Staniford | H04L 63/1416 726/25 |
| 2013/0263280 | A1* | 10/2013 | Cote | G06F 3/04886 726/26 |
| 2016/0330233 | A1* | 11/2016 | Hart | H04L 63/20 |
| 2016/0344758 | A1* | 11/2016 | Cohen | H04L 63/145 |
| 2017/0046627 | A1 | 2/2017 | Flood | |
| 2017/0214701 | A1* | 7/2017 | Hasan | H04L 63/1433 |
| 2017/0324768 | A1* | 11/2017 | Crabtree | H04L 63/1433 |
| 2018/0276710 | A1 | 9/2018 | Tietzen | |
| 2019/0014148 | A1* | 1/2019 | Foster | H04L 63/0209 |
| 2019/0205905 | A1 | 7/2019 | Raghunathan | |
| 2019/0205939 | A1 | 7/2019 | Lal | |
| 2019/0356679 | A1* | 11/2019 | Sites | H04L 63/1416 |
| 2020/0394565 | A1 | 12/2020 | Neumann | |
| 2021/0118071 | A1 | 4/2021 | Agarwal | |
| 2021/0133850 | A1 | 5/2021 | Ayush | |
| 2021/0149886 | A1 | 5/2021 | Zheng | |
| 2022/0343432 | A1 | 10/2022 | Magdelinic | |
| 2025/0055878 | A1* | 2/2025 | Bahl | H04L 63/102 |

* cited by examiner

SYSTEMS AND METHODS FOR IDENTIFYING ELECTRONIC ACCOUNTS BASED ON NEAR REAL TIME MACHINE LEARNING IN AN ELECTRONIC NETWORK

TECHNOLOGICAL FIELD

Example embodiments of the present disclosure relate to systems and methods for identifying electronic accounts based on near real time machine learning in an electronic network.

BACKGROUND

Accurate, efficient, and near real time scoring of electronic accounts and their likelihood to perform a certain task, such as but not limited to performing some cybersecurity threat task, are more difficult to determine now more than ever. Such issues are exacerbated when electronic accounts and their associated data are spread across multiple different application within a network, where each application may have their own standard format of identifying electronic accounts likely to perform the task (such as those electronic accounts likely to fall for a cybersecurity threat) and where each application may have their own rules and storage mechanisms. Further, there exists a need where such applications may comprise their own unstructured datasets for electronic accounts that are difficult to parse and understand in an automatic and efficient manner. Thus, there exists a need for a system to take data from multiple applications, such as data regarding electronic accounts across different applications, and standardize and organize the important data with respect to the electronic accounts to determine the electronic account's likelihood or unlikelihood (e.g., a propensity score) to perform a certain task, whereby the certain task may change dynamically and often.

Applicant has identified a number of deficiencies and problems associated with systems and methods for identifying electronic accounts based on near real time machine learning in an electronic network. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for identifying electronic accounts based on near real time machine learning in an electronic network.

In one aspect, a system for identifying electronic accounts based on near real time machine learning in an electronic network is provided. In some embodiments, the system may comprise: a processing device; a non-transitory storage device containing instructions when executed by the processing device, causes the processing device to perform the steps of: identify at least one data storage component, wherein at least one data store component comprises data associated with an at least one application; determine at least one current requirement of the data, wherein the at least one current requirement comprises at least one of an objective priority, a driver of propensity, or a progression requirement; receive at least one data segment from the data storage component associated with the at least one application; collect at least one current element from the at least one data segment; reformat and aggregate the at least one current element and link the at least one current element to a unique entity identifier; apply a trained machine learning model to the at least one current element; generate, by the trained machine learning model a new data segment, wherein the new data segment is based on the at least one current element of the new data segment; and generate a propensity score based on at least one of the unique entity identifier, the at least one current element, or the at least one new data segment, wherein the propensity score is in relation to at least one the objective priority, the driver of propensity, or the progression requirement, and wherein the propensity score is based on the at least one data segment associated with the unique entity identifier and the at least one new data segment.

In some embodiments, the instructions may further cause the processing device to: access at least one application data repository associated with the at least one application; retrieve, from the at least one application data repository, at least one archived data segment; identify, for each archived data segment of the at least one archived data segment, an at least one propensity score algorithm, wherein the at least one propensity score algorithm is used to determine the propensity score for the at least one unique entity identifier; and generate a table of entities, the table of entities comprising the at least one unique entity identifier associated with the propensity score that meets or exceeds a propensity score threshold. In some embodiments, the instructions may further cause the processing device to: generate an output data report based on the table of entities; and apply the output data report to the trained machine learning model.

In some embodiments, the instructions may further cause the processing device to: generate an optimization algorithm based on a method of training an untrained machine learning model to generate the trained machine learning model, the method of training the untrained machine learning model comprising: collecting a set of data segments from the at least one storage component associated with the at least one application; applying at least one transformation to each data segment of the set of data segments; creating a first training set comprising the set of data segments associated with at least one of: a customer event hub, an enterprise event hub, at least one application programming interface, messaging data, or at least one data packet; training the untrained machine learning model in a first stage using the first training set; creating a second training set for a second stage of training comprising the first training set and a plurality of propensity scores that are incorrectly above a propensity score threshold after the first stage of training; and training the untrained machine learning model in a second stage using the second training set. In some embodiments, the instructions may further cause the processing device to: receive, for each data segment of the at least one data segment, the optimization algorithm used to optimize an accuracy of the propensity score, wherein the optimization algorithm is determined based on a highest realizable propensity score based on the at least one current requirement. In some embodiments, the instructions may further cause the processing device to determine the accuracy of the propensity score based on a correctness rate, wherein the correctness rate is based on an output data report using a table of entities with a propensity score above a propensity score threshold. In some embodiments, the instructions may further cause the processing device to: determine that a propensity score meets at least one of the objective priority, the driver of propensity, or the progression requirement associated with the new data segment; and implement a propensity score algorithm on the new data segment based on at least determining that the propensity score algorithm meets the objective priority or driver of propensity or progression requirement.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
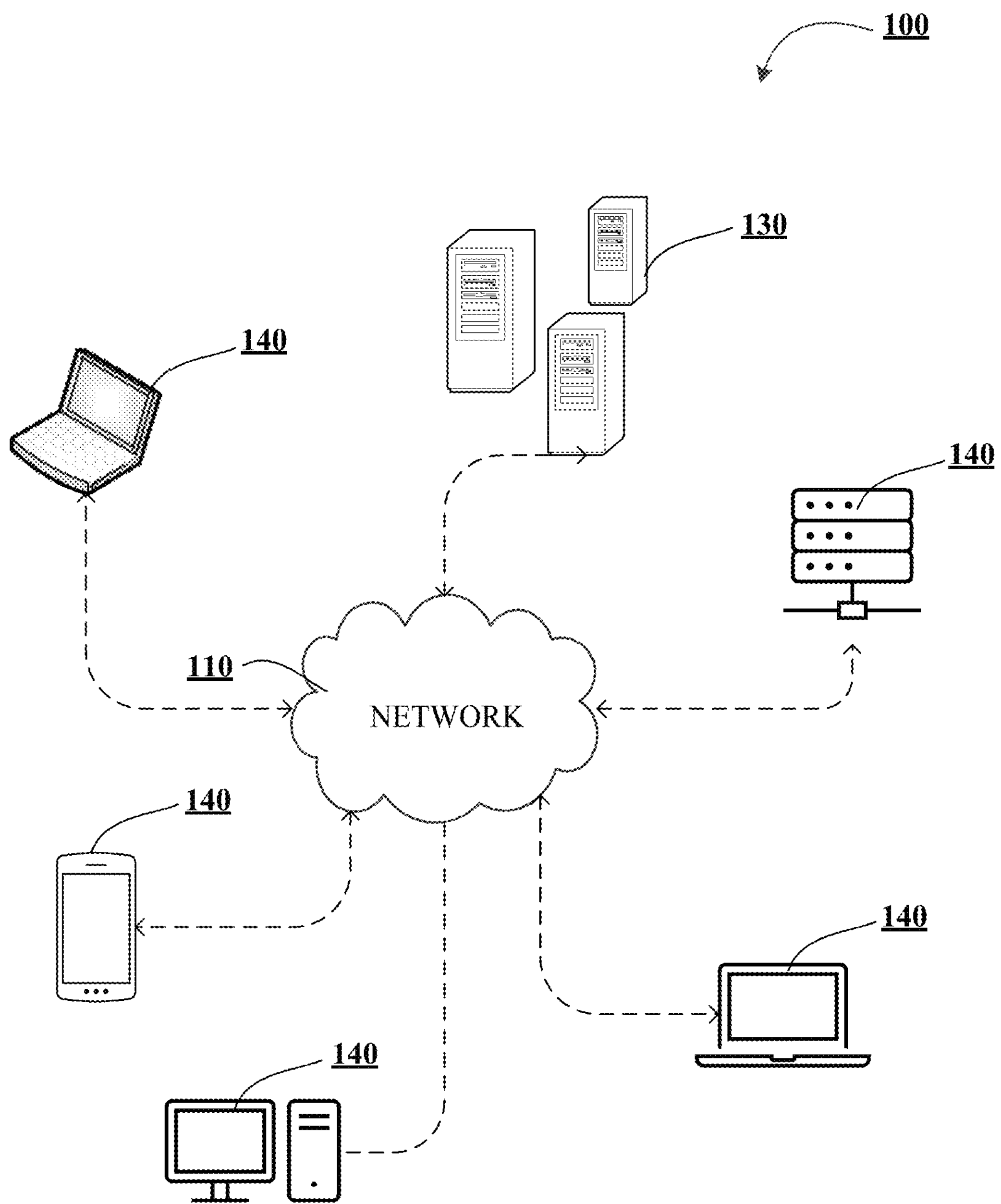
Figure 1B:
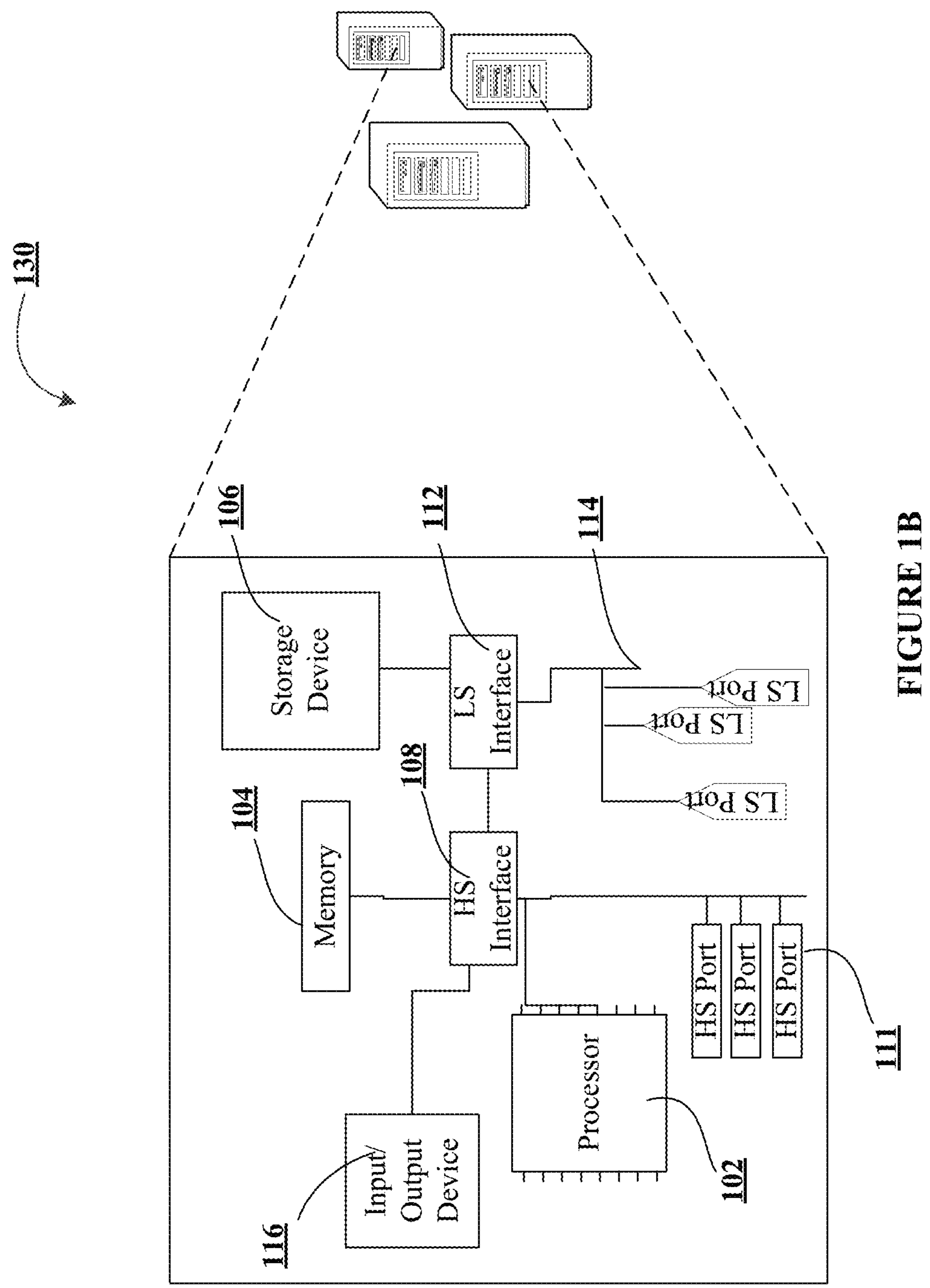
Figure 1C:
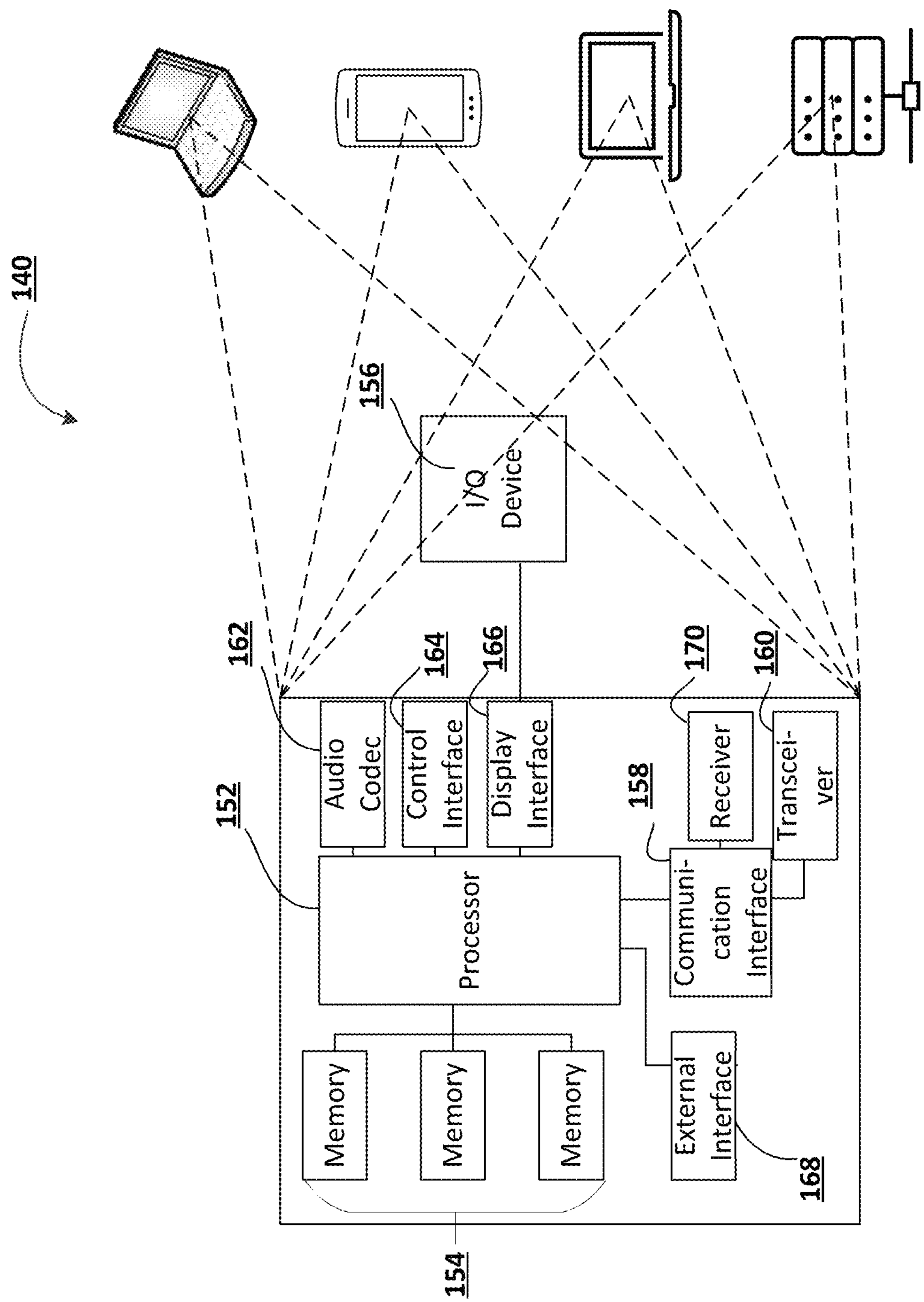
Figure 2:
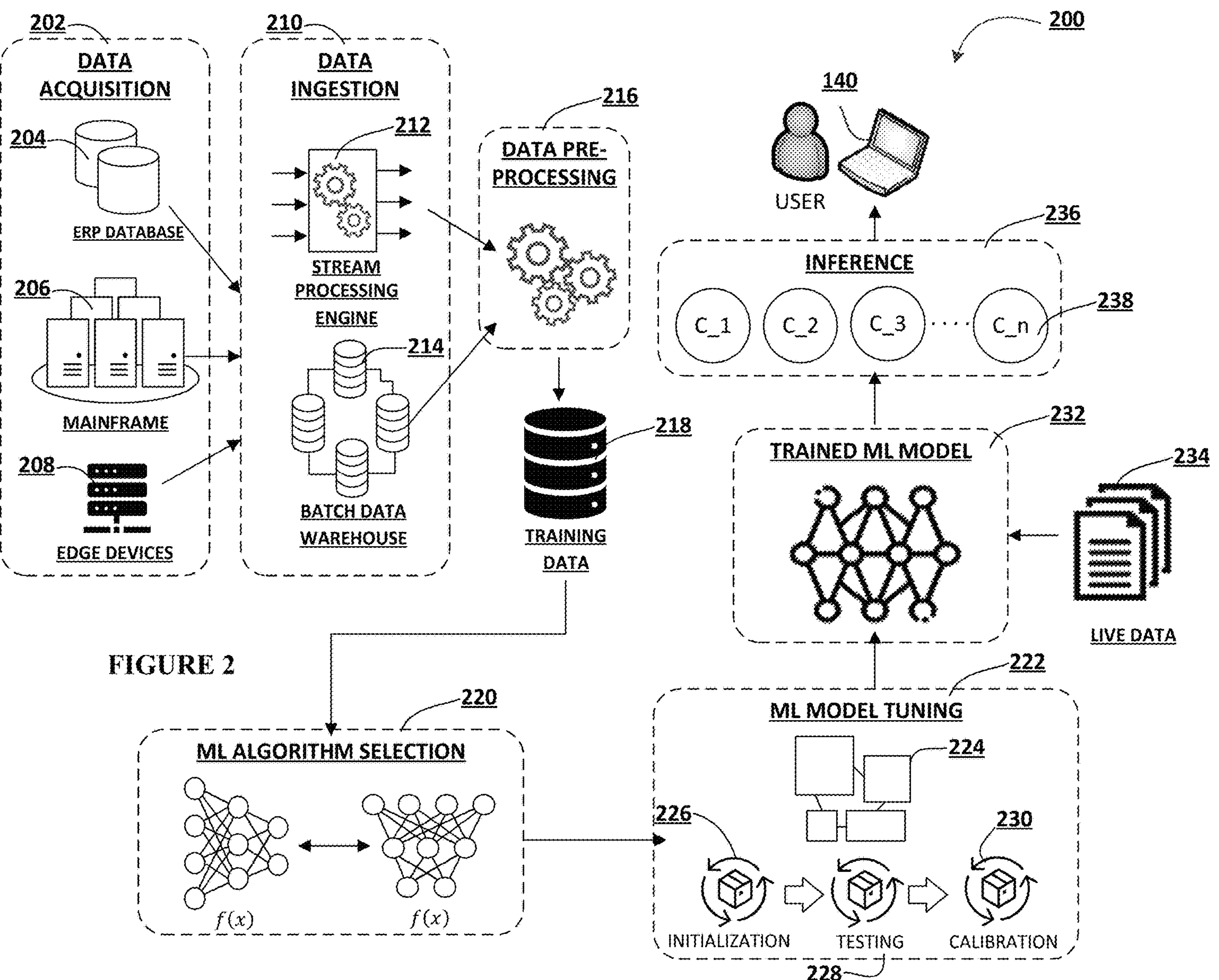
Figure 3:
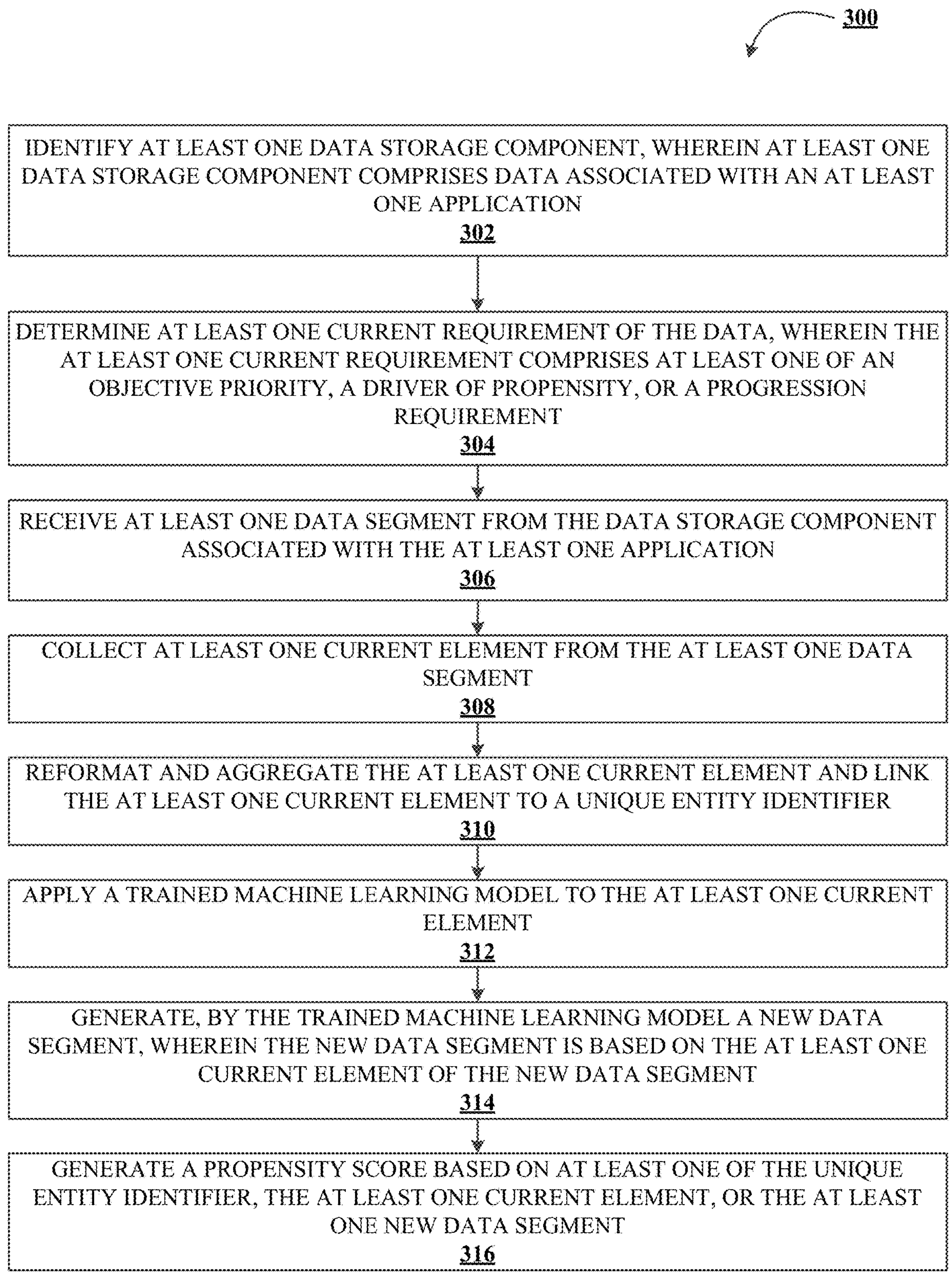
Figure 4:
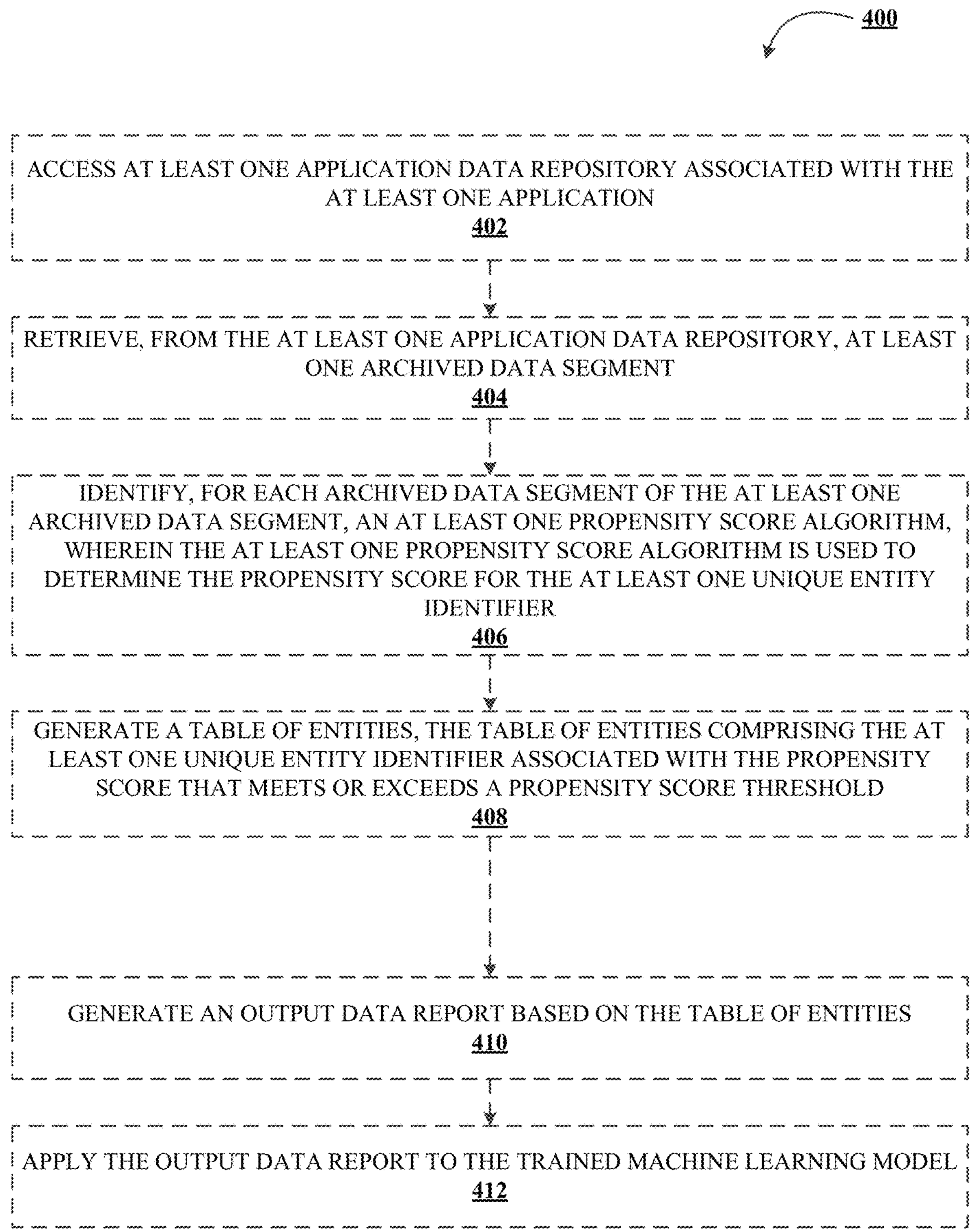
Figure 5:
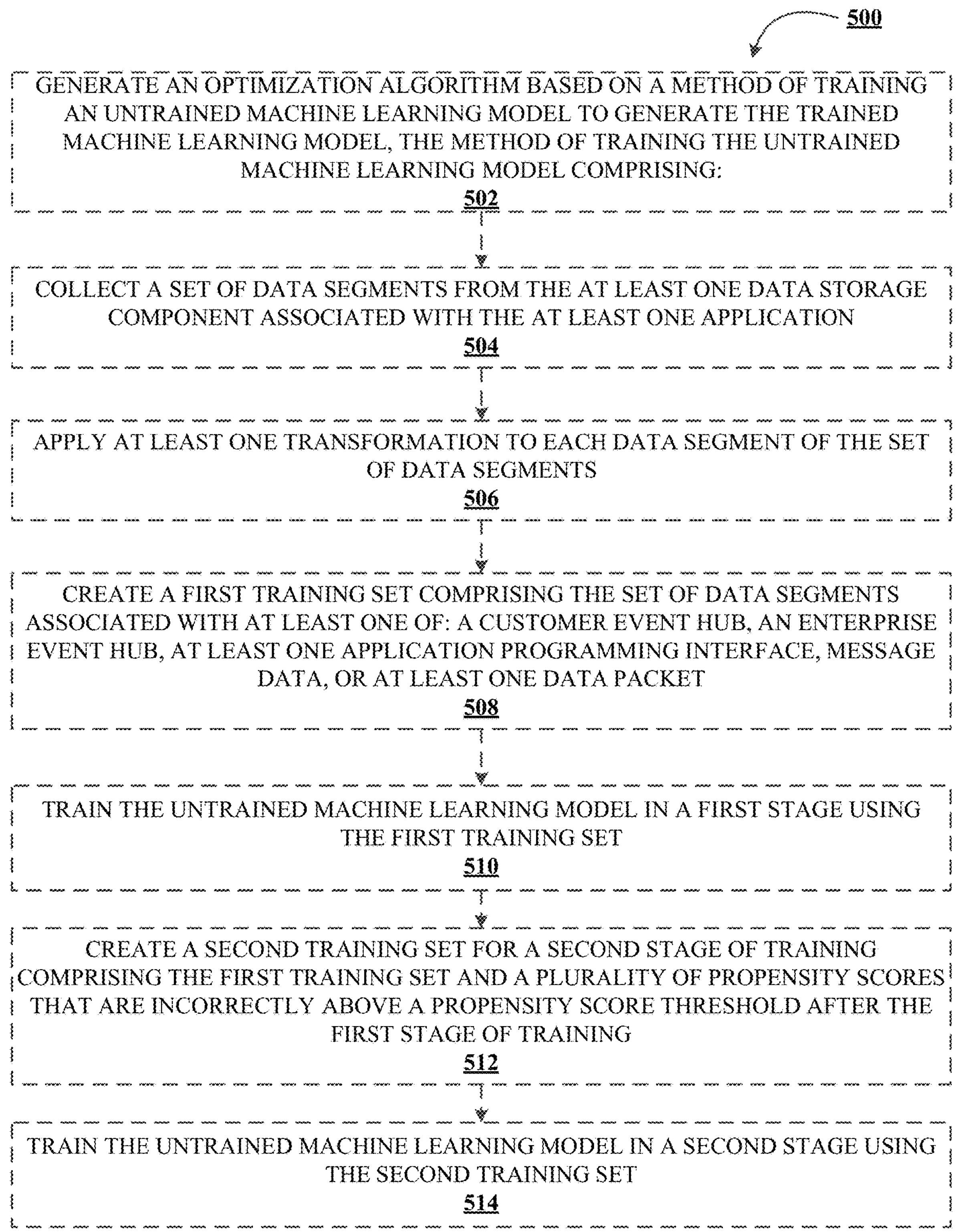
Figure 6:
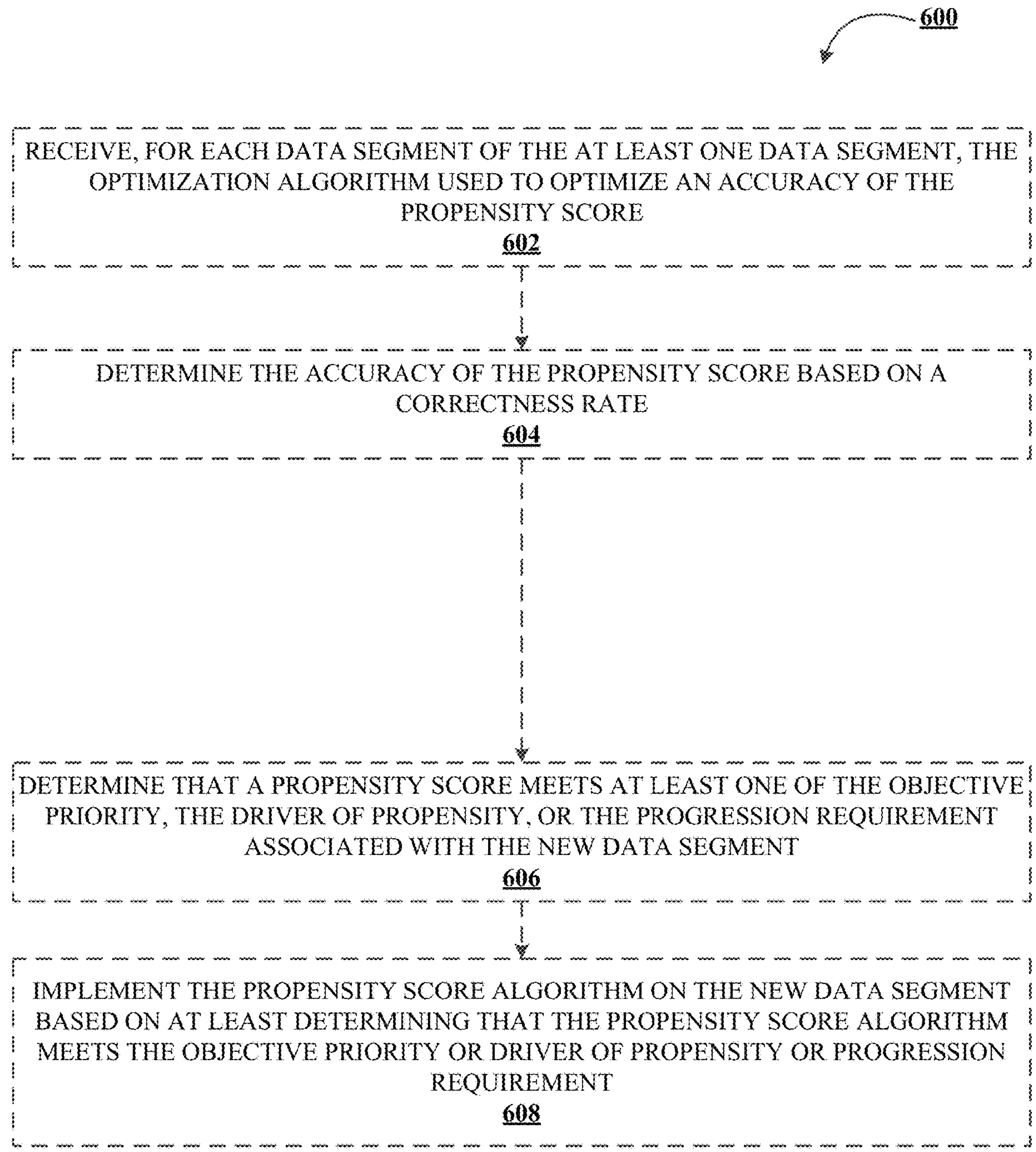

FIGS. 1A-1C illustrates technical components of an exemplary distributed computing environment for identifying electronic accounts based on near real time machine learning in an electronic network, in accordance with an embodiment of the disclosure;

FIG. 2 illustrates technical components of an exemplary machine learning subsystem, in accordance with an embodiment of the disclosure;

FIG. 3 illustrates a process flow for identifying electronic accounts based on near real time machine learning in an electronic network, in accordance with an embodiment of the disclosure;

FIG. 4 illustrates a process flow for generating an output data report using the table of entities and applying the output data report to the trained machine learning model, in accordance with an embodiment of the disclosure;

FIG. 5 illustrates a process flow for generating a training set of data and training the machine learning model in an iterative process, in accordance with an embodiment of the disclosure; and FIG. 6 illustrates a process flow for implementing a propensity score algorithm on the new data segment, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Accurate, efficient, and near real time scoring of electronic accounts and their likelihood to perform a certain task, such as but not limited to performing some cybersecurity threat task, are more difficult to determine now more than ever. Such issues are exacerbated when electronic accounts and their associated data are spread across multiple different application within a network, where each application may have their own standard format of identifying electronic accounts likely to perform the task (such as those electronic accounts likely to fall for a cybersecurity threat) and where each application may have their own rules and storage mechanisms. Further, there exists a need where such applications may comprise their own unstructured datasets for electronic accounts that are difficult to parse and understand in an automatic and efficient manner. Thus, there exists a need for a system to take data from multiple applications, such as data regarding electronic accounts across different applications, and standardize and organize the important data with respect to the electronic accounts to determine the electronic account's likelihood or unlikelihood to perform a certain task (e.g., a propensity score), whereby the certain task may change dynamically and often.

Further, accurate propensity scores—such as those associated with entities in the context of an objective—are also difficult to create and can quickly become outdated due to the data being used. Thus, there exists a need for a system to accurately, efficiently, and in near real time determine propensity scores for entities in the context of an objective, especially when data repositories are otherwise static and existing propensity scores may not consider the interplay of separate data repositories among different applications.

Managers of electronic networks having many applications within an electronic network often desire to pool insights from separate and static/dynamic applications and combine these insights into a propensity towards a certain driver or objective in an accurate, iterative, and dynamic manner. Furthermore, the closer to real time the information is, the more likely these insights will be accurately actionable. For instance, such managers of the electronic networks may wish to know immediately, based on recent near real time information, a specific group of entities', whose data is available on several separate applications, propensity towards a certain business priority, driver of propensity, and/or trend in an accurate and actionable way. A need, therefore, exists for a system to broadly, accurately, efficiently, and dynamically identify, generate, and report propensity scores for near real time application data on entities in an electronic network.

Accordingly, the present disclosure is directed to a system for identifying in near real time a propensity score specific to one entity in the context of a business priority/objective priority, a driver of the propensity, a progression requirement, or trend using different applications and models within an electronic network. For instance, the system accepts strategic element inputs from several currently, yet separately, utilized applications such as PR (preferred rewards), ICDP (integrated credit decisioning platform), deception, home loans, and the like via an omnichannel into a unique identifier key store. The unique identifier key store may be used alongside a machine learning model, whose training inputs may comprise a CEH (customer event hub), a EEH (enterprise events hub), APIs (application programing interfaces), messaging, data packets, and the like as well as a business priority or other driver to create a propensity score. This system will use the propensity score to report, where said report identifies high value customers as well as serves to train the machine learning model on its efficacy, creating an incrementally improving data loop after results are received.

What is more, the present disclosure provides a technical solution to a technical problem. As described herein, the technical problem includes the near real time determination and identification of electronic accounts based on data collected across multiple applications (e.g., each with their own standard format for data), where the electronic accounts need to be identified efficiently dynamically for a likelihood or unlikelihood to perform an action. The technical solution presented herein allows for a system configured with a trained machine learning model and an omni channel input from multiple applications to take in data from multiple applications, standardize the data, standardize and generate a unique entity identifier for the electronic accounts across the applications, and generate a propensity score for each electronic account. In particular, the system described herein is an improvement over existing solutions to generating a propensity score from multiple applications and their associated electronic accounts, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution (e.g., by filtering the data multiple time to determine the most relevant data for the machine learning model to consider in generating the propensity score), (iii) removing manual input and waste from the implementation of the solution, thus improving speed and efficiency of the process and conserving computing resources, (iv) determining an optimal amount of resources that need to be used to implement the solution and to store the solution, thus reducing network traffic and load on existing computing resources (including the optimal amount of data needed to be stored within the system from the multiple applications, because the system may only need to consider the most relevant data for each electronic user account). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for systems and methods for identifying electronic entity accounts based on propensity scores generated by near real time machine learning in an electronic network 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates the process flow for identifying electronic accounts based on near real time machine learning in an electronic network, in accordance with an embodiment of the disclosure. In some embodiments, a system (e.g., similar to one or more of the systems described herein with respect to FIGS. 1A-1C) or systems (e.g., similar to one or more of the systems described herein with respect to FIGS. 1A-1C and 2) may perform one or more of the steps of process flow 300. For example, a trained machine learning model (e.g., the system 232 described herein with respect to FIG. 2) may perform some steps of process 300.

As shown in block 302, the process flow 300 may include the step of identifying at least one data storage component, wherein at least one data storage component comprises data associated with at least one application. As used herein, the at least one data storage component associated with at least one application is understood to refer to a data storage device or module associated an application, whereby such a data storage component is configured to store data associated with user accounts (such as individual user accounts and/or entity user accounts, and their identifiers), the user accounts' data for each application (e.g., each application may consider only certain types of data important to the application's purpose, such as where the application is concerned with cybersecurity, the application may use data such as geographical locations of a user account, access data of the user account, and/or the like), scorings and/or rankings of the user accounts (e.g., where an application scores or ranks user accounts for its specific purposes) and/or the like.

Such a data storage component may comprise a database, an index, an application data repository (such as a data library or data archive), and/or a network-based storage for each application associated with the system. In some embodiments, each data storage component may comprise a physical storage location or utilize a cloud-based or other remote-based storage system. In some embodiments, this may include a storage component that is static or a storage component that is connected to the internet to allow for near real time data. In some embodiments, and where an application comprises its own individual database, the system may be configured to access (such as across a network, like that shown in FIG. 1A) and/or accept the data of the application by collecting and/or receiving data from each application's database.

As described herein, the system may be associated with a plurality of applications (such as a plurality of applications that are owned, operated, and/or used by a client of the system, such as a business or entity), such that the system is configured to analyze the data of the plurality of applications continuously and in parallel. In some embodiments, the application(s) (and their associated data) may be connected by a multi-channel input that inputs the data (and/or certain elements like that described below (e.g., pre-selected elements of importance)) to a particular component of the system for further formatting and aggregation of the data from each application into a singular and standard format. In some embodiments, such data input from each of the applications to the system may be in an unstructured format and/or in individualized structured formats (whereby each individualized structured format may be specific to each application and/or different between each application).

As shown in block 304, the process flow 300 may include the step of determining at least one current requirement of the data, wherein the at least one current requirement comprises at least one of an objective priority, a driver of propensity, or a progression requirement. For example, the current requirement of data may be used by the system to determine what data is collected and indicated as important from each application of the at least one application (e.g., plurality of applications). For instance, such data may be collected for a particular, predetermined objective priority (such as a business objective, a security or cybersecurity objective, a geographical objective, a public relations objective, and/or the like); a driver of propensity (such as data associated with determining an electronic account's/user account's propensity to accept something, follow something, reject something, perform something, and/or the like); a progression requirement (such as data associated with scoring or ranking a user account within the application, and the associated data used to determine the ranking or scoring), and/or the like. In some embodiments, such a progression requirement may be associated with different rankings withing each application, such as data used to determine a likelihood of security threat, cybersecurity threat, a likelihood of accepting or signing up for particular resources or resource offers (like resource credit offers, resource savings offers, and/or the like), and/or the like.

In some embodiments, the at least one of an objective priority, at least one driver of propensity, or at least one progression requirement may be identified by an internal source or external source. For instance, the objective priority (ies), driver of propensity(ies), and/or the progression requirement(s) may be identified based on pre-generated rules, such as but not limited to entity or business rules regarding what is important in generating scores for user accounts, generating a ranking of user accounts and/or identifying important user accounts for each application, and/or the like. In this manner, the objective priority(ies) driver of propensity(ies), and/or the progression requirement (s) are identified by an internal source within the overall system (such as by a manage of the system). In some embodiments, the internal source of identifying the objective priority(ies), driver of propensity(ies), and/or the progression requirement(s) may be identified by the system itself, such as but not limited to the trained machine learning model described herein. Additionally, and/or alternatively, the objective priority(ies), driver of propensity(ies), and/or the progression requirement(s) may be identified from an external source, such as but not limited to a client of the system, and/or the like.

As shown in block 306, the process flow 300 may include the step of receiving at least one data segment from the data storage component associated with the at least one application. As used herein, a data segment of the at least one data segment refers to pieces and/or sections of data associated with user accounts of each application, whereby the data segments received and/or collected are based on the objective priority(ies), driver of propensity(ies), the progression requirement(s), and/or the like. For instance, the data segment(s) collected and/or received by the system may comprise data needed to make determinations regarding the objective priority(ies), driver of propensity(ies), the progression requirement(s), and/or the like, and/or data that may be needed but is not yet known if the system will need the data for making these determinations.

In some embodiments, the system may receive all the data for each user account from each application and may filter the data within a particular component, such as the unique identifier key store. Such a unique identifier key store may sit within the system and be operated by the system to determine the important data needed in making determinations regarding the objective priority(ies), driver of propensity(ies), the progression requirement(s), and/or the like, and linking such data with a unique entity identifier (based on the user account identifiers and/or entity account identifiers of the applications) after reformatting and aggregating the important data to form a standardized format of the important data within the user account identifier key component. In this manner, the unique identifier key store may act to filter the important data from each application (which may each comprise their own individualized scoring, ranking, and/or formatting), generating a standardized format of the data, and generating a standard scoring and/or ranking of each user account by linking the standard scoring and/or ranking to the unique entity identifier. Further, and used herein, the unique entity identifier may additionally and/or alternatively be its own standard identifier for a user account and/or business entity from different applications, whereby each application may comprise their own user account identifiers that may be different for a single user account or business entity account.

As used herein, the unique entity identifier refers to unique string of alphanumeric characters to identify an entity, a user account, and/or the like, by the system, whereby the unique entity identifier is a standard identifier that is same for multiple applications and identifies the same user account. For instance, the system may generate the unique entity identifier based on individual and/or different unique identifiers for each application which identifies the same user account (but may comprise different strings of alphanumeric characters) and may store the unique entity identifier in the system's own component (rather than within each individual application). Such a unique entity identifier may be linked to each of the user account identifiers for each application, such that even where the user account identifiers actually refer to the same user account but comprise different unique strings, the system may identify the singular user account and their associated data from each application. The system may identify the user account identifiers from each application as being associated with the same user account and/or user based on identifying data, such as a name, a phone number, a physical address, an email address, and/or the like.

As shown in block 308, the process flow 300 may include the step of collecting at least one current element from the at least one data segment. In some embodiments, the current element will be identified in part from the at least one of an objective priority, a driver of propensity, or a progression requirement. For example, the system may collect current element(s) from the data segment(s) (e.g., pieces of the data from each application), such that the collected current element are considered important in making the determinations regarding the objective priority(ies), driver of propensity (ies), the progression requirement(s), and/or the like. In this manner, the system may parse the data and filter the data of the data segments from each application based on the data being necessary and/or important to the objective priority (ies), driver of propensity(ies), the progression requirement (s), and/or the like. Thus, and in this embodiment, only the data needed for the objective priority(ies), driver of propensity(ies), the progression requirement(s), and/or the like are collected from the data segments by the system. Therefore, the current elements considered by the system are streamlined and aggregated such that only such data is stored and/or considered by the system. Such a decrease in data storage may lead to faster processing speeds, efficient use of resources, and/or the like. In some embodiments, such current elements may be additionally and/or alternatively collected historically and up to in real time and/or near real time, such that the system may comprise a full and whole record of the important data for each unique entity identifier.

As shown in block 310, the process flow 300 may include the step of reformatting and aggregating the at least one current element and linking the at least one current element to a unique entity identifier. In some embodiments, this step may involve an additional storage component to store the aggregated or reformatted data. For instance, the system may reformat the current elements and their associated data, which may comprise separate ratings and/or scorings from each of the application(s), which are individually determined by each application. In some embodiments, each application may be associated with a team within a client's organization, and each application may comprise their own team rules and/or business rules which are used to determine the important data and/or generate scoring and/or rankings for each user account identifier. Thus, and in some embodiments, the system may reformat the current elements and their associated data, wherein the current data may comprise separate entity rules for each of the applications. Such reformatting and aggregating may occur by at least one of the methods including but not limited to: aggregating the current elements and associated scores/ratings to generate a standardized singular form of a score and/or rating associated with a user account identifier and/or by generating a brand new standardized singular form of a score based on a scoring algorithm (such as a propensity scoring algorithm like that described below with respect to FIG. 4).

Thus, and in some embodiments, the aggregated and reformatted current element(s) may then linked to the unique entity identifier, such as within a database, a data repository, and/or the like within the system itself, and/or within a component of the system such as a unique identifier key store.

As shown in block 312, the process flow 300 may include the step of applying a trained machine learning model to the at least one current element. In some embodiments, this step may comprise training the model to increase the accuracy thereof, including but not limited to iteratively training. For example, the system may apply the trained machine learning model to the at least one current element, such that the trained machine learning model may process the at least one current element for each unique entity identifier to determine a propensity score (which is described in further detail below). For instance, a trained machine learning model may be used by the system and applied to the at least one current element, such as the machine learning model like that shown in FIG. 2. Additionally, example training for an untrained machine learning model to generate the trained machine learning model is described in further detail below with respect to FIG. 5.

As shown in block 314, the process flow 300 may include the step of generating—by the trained machine learning model—a new data segment, wherein the new data segment is based on the at least one current element of the new data segment. For example, the system may generate a new data segment from the current element(s) processed by the trained machine learning model, such that the new data segment may comprise the data that is the most relevant and/or only the data that is relevant to generating a propensity score(s).

As shown in block 316, the process flow 300 may include the step of generating a propensity score based on at least one of the unique entity identifier, the at least one current element, or the at least one new data segment. As used herein, the propensity score refers a numerical score, a letter score, a ranking, and/or the like that indicates how likely and/or unlikely the user account/entity account is to complete the objective priority(ies), the driver of propensity(ies), to meet the progression requirement (depending on the progression requirement), and/or the like. Therefore, the propensity score(s) may be used to identify how likely and/or unlikely a user account is to accept, reject, perform, and/or the like for an objective, an offer, a security threat/cybersecurity threat, and/or the like. The kind of propensity (e.g., a likelihood or unlikelihood) may be predetermined before the propensity score is generated and used by the trained machine learning model to generate the propensity score. In some embodiments, the propensity score may comprise a low score to indicate an unlikelihood for the user account and/or a high score to indicate a high likelihood for the user account.

In some embodiments, the propensity score may be based on the at least one data segment associated with the unique entity identifier and the at least one new data segment. For example, the propensity score is based on the new data segment and its associated data it comprises for each of the unique entity identifier(s), whereby each new data segment comprises the data needed and/or used as a factor for the propensity score. In this manner, only the data relevant to generating the propensity score is considered by the trained machine learning model to generate the propensity scores.

FIG. 4 illustrates the process flow for generating an output data report using the table of entities and applying the output data report to the trained machine learning model, in accordance with an embodiment of the disclosure. In some embodiments, a system (e.g., similar to one or more of the systems described herein with respect to FIGS. 1A-1C) or systems (e.g., similar to one or more of the systems described herein with respect to FIGS. 1A-1C and 2) may perform one or more of the steps of process flow 400. For example, a trained machine learning model (e.g., the system 232 described herein with respect to FIG. 2) may perform some steps of process 400.

In some embodiments, and as shown in block 402, the process flow 400 may include the step of accessing at least one application data repository associated with the at least one application. For example, the system may access the application data repository and/or receive data directly from the application data repository(ies) of the application(s) with the data of each user account identifier for each application.

In some embodiments, there may exist applications that share data repositories. For example, the system may access the application data repository and/or receive data from a single application data repository that is associated with multiple applications, and stores user account data for the multiple applications.

In some embodiments, and as shown in block 404, the process flow 400 may include the step of retrieving, from the at least one application data repository, at least one archived data segment. For example, the system may retrieve an archived data segment, whereby the archived data segments may comprise historical data segments that are similar to the current and/or new data segments, but which are associated with a previous period in time. Thus, and in this manner, the system may access and retrieve historical data from the application data repository(ies) of historical data only, rather than current and/or real time data of the user account(s). In some embodiments, the system may only retrieve particular archived data segments associated with a particular purpose and/or associated with historical user accounts that are no longer active clients of the application(s).

In some embodiments, and as shown in block 406, the process flow 400 may include the step of identifying—for each archived data segment of the at least one archived data segment—an at least one propensity score algorithm, wherein the at least one propensity score algorithm is used to determine the propensity score for the at least one unique entity identifier. Based on the archived data segment(s), the system may identify a propensity score algorithm that works for the archived data segment(s), such that the archived data segment(s) may be used to test the propensity score algorithms to determine if the propensity score algorithm works for each of the user accounts of the archived data segments. In this manner, the identified propensity score algorithm may be generated and refined based on the archived data segments before being used in real time by the trained machine learning model on the current element(s).

In some embodiments, the system may use the machine learning model (such as the trained machine learning model) to identify the propensity score algorithm.

As used herein, the propensity score algorithm may be an actual algorithm, a process, a set of rules, and/or the like and may be continuously refined by the trained machine learning model, and/or the like. Such a propensity score algorithm may be continuously refined with the current elements analyzed and processed by the system, the new data segments generated/identified by the trained machine learning model, and the propensity scores generated by the trained machine learning model.

In some embodiments, the trained machine learning model may comprise a feedback loop comprising user inputs from user devices associated with the user accounts, whereby the user inputs as are associated with the propensity scores. For example, and based on the generated propensity score, the system may identify a user as likely to react positively to an offer (such as an offer associated with the current elements considered by the system and based on historical information of the user account from a particular application associated with the application), and may transmit an offer interface component to the user device associated with the user account to indicate the proposed offer. In response to the offer interface component configuring the graphical user interface (GUI) of the user device, the user of the user device may input an indication accepting or rejecting the offer. If the user ends up inputting an indication to reject the offer, such a user input may be used as negative feedback to the trained machine learning model that it was wrong in its propensity score indicating a high likelihood of acceptance, such negative feedback may then be used for further training of the trained machine learning model. Additionally, and in the instance where the user input is an acceptance of the offer, the system may transmit positive feedback to the trained machine learning model for further training.

In some embodiments, and as shown in block 408, the process flow 400 may include the step of generating a table of entities, the table of entities comprising the at least one unique entity identifier associated with the propensity score that meets or exceeds a propensity score threshold. The system may generate the table of entities to comprise an index and/or record of the propensity score(s) and associated unique entity identifier(s).

In some embodiments, the table of entities may comprise a propensity score threshold that filters out the unique entity identifiers associated with propensity scores that are less than the propensity score threshold. In this manner, the index and/or record may comprise the unique entity identifiers that are most likely for the propensity score. Such a propensity score threshold may be predetermined, such as by the system itself (based on previously identified propensity scores that were associated with user accounts that actually met the prediction of the propensity score's high likelihood), by a client of the system, by a manager of the system, and/or the like.

In some embodiments, and as shown in block 410, the process flow 400 may include the step of generating an output data report based on the table of entities. In some embodiments, the format of the output data report may vary. For example, the system may generate an output data report based on the table of entities that comprises the unique entity identifiers with propensity scores that meet and/or exceed the propensity score threshold. Such a report may be stored in a database, in a data repository, and/or a storage component of the system, in a client's database and/or storage component, and/or the like. In some embodiments, the output data report may be transmitted and/or sent to a client of the system, and/or the like, for use in determining business practices, objectives, progressions, a driver of propensity, and/or the like. In some embodiments, and upon generating the output data report, the output data report may be automatically transmitted as an interface component (e.g., a data packet that can be rendered on a GUI of a user device) to a user device, such as a user device associated with the client of the system, and configure the GUI of the user device to automatically render the output data report on the GUI of the user device immediately after it's been generated.

As shown in block 412, the process flow 400 may include the step of applying the output data report to the trained machine learning model. For instance, the system may apply the output data report to the training machine learning model for further train, such that the generating of each output data report is used to iteratively train the trained machine learning model. Such a continuous training may be based on continuously updating previously generated output data reports and/or generating new output data reports, which have not previously been generated before.

FIG. 5 illustrates the process flow for generating a training set of data and training the machine learning model in an iterative process, in accordance with an embodiment of the disclosure. In some embodiments, a system (e.g., similar to one or more of the systems described herein with respect to FIGS. 1A-1C) or systems (e.g., similar to one or more of the systems described herein with respect to FIGS. 1A-1C and 2) may perform one or more of the steps of process flow 500. For example, a trained machine learning model (e.g., the system 232 described herein with respect to FIG. 2) may perform some steps of process 500.

In some embodiments, and as shown in block 502, the process flow 500 may include the step of generating an optimization algorithm based on a method of training an untrained machine learning model to generate the trained machine learning model. Such a method of training the untrained machine learning model is described in further detail below.

As used herein, the optimization algorithm refers to an algorithm, process, and/or set of rules to optimize the trained machine learning model (which comprises both the untrained machine learning model and the trained machine learning model). In some embodiments, the optimization algorithm may alter the selection of current elements from the data segments to increase the accuracy of the propensity score, such that only the current elements relevant for the propensity score generate are considered. For instance, the optimization algorithm, through an iterative process, may determine which current elements have the highest correlation or relevancy in regard to the accuracy of the propensity score. Such an iterative process may occur after the output data report is input to the machine learning model at a first time. In some embodiments, the iterative process may occur multiple times and/or continuously after the output data report is input to the trained machine learning model in a first instance, such that the trained machine learning model may always use the optimization algorithm to determine the relevant current element(s).

In some embodiments, and as shown in block 504, the process flow 500 may include the step of collecting a set of data segments from the at least one data storage component associated with the at least one application. For example, and for the purpose of training the untrained machine learning model, the system may collect the set of data segments from the data storage component, whereby such data segments may comprise historical and/or archived data segments and their associated data for each of the applications associated with the system and analyzed by the system. In this manner, the untrained machine learning model may analyze the historical and/or archived data segments (and its associated data) to generate propensity scores and identify new data segments.

In some embodiments, and as shown in block 506, the process flow 500 may include the step of applying at least one transformation to each data segment of the set of data segments. For example, the system may apply at least one transformation to each data segment, whereby a transformation may comprise data normalization, data trimming, expanding the data sets, and/or the like. In some embodiments, the transformation of each data segment may additionally and/or alternatively comprise physically changing the underlying data format of the data segments, such that the changed or updated data segments are compatible with the input requirements of the machine learning model system (such as where the machine learning model has a particular format for its inputs).

In some embodiments, and as shown in block 508, the process flow 500 may include the step of creating a first training set comprising the set of data segments associated with at least one of a customer event hub, an enterprise event hub, at least one application programming interface (API), messaging data, or at least one data packet. For example, and in some embodiments, the customer event hub described herein may comprise an application associated with all the user accounts' events for a client (including all the application operated by the client and the associated events within each), such as by ingesting data for each event from any source, whereby each event of each user account associated with a client may be tracked and data may be generated and stored. Similarly, the enterprise event hub may act in a similar manner to the customer event hub in that the enterprise event hub is an application associated with all the applications of a client (e.g., an enterprise), which is configured to ingest data for each of the applications of the client, tracking each of the events, and generating data from each of the tracked events. The application programming interface(s) as described herein may comprise a method for communicating between two or more computer programs, websites, applications, and/or the like, whereby such communication data may be tracked and stored by the system. Such messaging data may refer to messaging data (such as between user accounts, between the user account and an application, and/or the like) within an application, between applications, and/or the like, whereby such messaging data may be tracked and stored by the system. By way of non-limiting example, the data packet may comprise any leftover data not already covered by the customer event hub, the enterprise event hub, the API, and/or the messaging data. Such data packets may comprise secondary and/or tertiary data not already tracked and/or stored by the system from the customer event hub, the enterprise event hub, the API, and/or the messaging data.

In some embodiments, and as shown in block 510, the process flow 500 may include the step of training the untrained machine learning model in a first stage using the first training set. In some embodiments, the training of the machine learning model will occur multiple times in an iterative fashion. For instance, the system may train the untrained machine learning model by applying the first training set to the untrained machine learning model to generate the trained machine learning model, at least initially. By applying the first training set to the untrained machine learning model, the system may train the untrained machine learning model with a first set of data to initially train the untrained machine learning model, but then may refine the training of the untrained machine learning model by applying more training sets.

In some embodiments, and as shown in block 512, the process flow 500 may include the step of creating a second training set for a second stage of training comprising the first training set and a plurality of propensity scores that are incorrectly above a propensity score threshold after the first stage of training. In some embodiments, the training of the machine learning model will occur multiple times in an iterative fashion. For example, the system may create a second training set in much the same way as the first training set, based on a second set of data different than the first training set. For instance, the data used for each data segment may be different, but the sources from which the data comes from may be the same and/or different.

In some embodiment, the system may use a plurality of propensity scores that are incorrectly above the propensity score threshold to train the untrained machine learning model in generating the propensity scores. Such propensity scores that comprise a propensity score incorrectly above the propensity score threshold may be labelled incorrect by a user of the system, by a user within a client of the system (such as a security member, a information technology services user, and/or the like), and/or the like, such as through the use of a feedback loop which may collect the data in real time from the users. Therefore, such data used in for training may then comprise the propensity score previously generated and the feedback of the incorrect indicator with respect to the propensity score being above the propensity score threshold.

In some embodiments, and where the user of the feedback loop is a user of the system (e.g., a customer of the client of the system) and based on the propensity score, an offer is generated, the system may collect a user input for the offer and use such data of the user input for feedback to the machine learning model. Similarly, and as the propensity score is used to generate offers, APIs, interface components to configure the GUI of a user device, and/or the like, the system may collect feedback from the end-user and/or end-viewer to continuously train the machine learning model.

In some embodiments, and as shown in block 514, the process flow 500 may include the step of training the untrained machine learning model in a second stage using the second training set. In some embodiments, the training of the machine learning model will occur multiple times in an iterative fashion. For example, and similar to training the untrained machine learning model in the first instance, the untrained machine learning model may be trained in a second instance by the second training set (such as by applying the untrained machine learning model to the second training set and/or receiving feedback from the second training set), and so forth.

FIG. 6 illustrates the process flow for implementing a propensity score algorithm on the new data segment, in accordance with an embodiment of the disclosure. In some embodiments, a system (e.g., similar to one or more of the systems described herein with respect to FIGS. 1A-1C) or systems (e.g., similar to one or more of the systems described herein with respect to FIGS. 1A-1C and 2) may perform one or more of the steps of process flow 600. For example, a trained machine learning model (e.g., the system 232 described herein with respect to FIG. 2) may perform some steps of process 600.

In some embodiments, and as shown in block 602, the process flow 600 may include the step of receiving, for each data segment of the at least one data segment, the optimization algorithm used to optimize an accuracy of the propensity score. For example, the optimization algorithm may be determined as the most accurate propensity score for the purpose of predicting an action of the user account. In some embodiments, the optimization algorithm may be used on the generated propensity score algorithm to decrease and/or increase the propensity score in order for the propensity score to make more accurate predictions. In some embodiments, the optimization algorithm may be a highest realizable propensity score (a highest propensity score before the accuracy in prediction starts to decrease) based on the at least one current requirement (such as based on the objective priority, the driver of propensity, the progression requirement, and/or the like)

In some embodiments, and as shown in block 604, the process flow 600 may include the step of determining the accuracy of the propensity score based on a correctness rate. For instance, the system may determine the accuracy of the propensity scores previously generated based on a correctness rate, whereby the correctness rate is based on the user input have receiving and/or seeing something associated with the propensity score (such as after receiving an offer, after receiving a cybersecurity threat that the propensity score identified the user as likely to be a cybersecurity problem as the user would likely accept the cybersecurity threat, and/or the like) divided by the all the instances the user has receive and/or seen something associated with the propensity score. Such a correctness rate may then be used to determine how accurate the propensity score is (event with the optimization algorithm).

In some embodiments, the correctness rate may be based on overall propensity scores for an entity and associated unique entity identifiers. For example, the correctness rate may be based on an output data report using a table of entities with a propensity score above a propensity score threshold, whereby only those propensity scores above the propensity score threshold are considered for the correctness rate and the accuracy of the propensity scores.

In some embodiments, and after the process described with respect to blocks 602-604, and as shown in block 606, the process flow 600 may include the step of determining that a propensity score meets at least one of the objective priority, the driver of propensity, or the progression requirement associated with the new data segment. For example, the system may determine that the propensity score meets the objective priority, the driver of propensity, the progression requirement, and/or the like based on determining that the propensity score is high and has a high likelihood of the user performing an action associated with the objective priority, the driver of propensity, the progression requirement, and/or the like. Such a determination that the user will perform an action may be determined based on a propensity score threshold, like that described hereinabove, whereby the propensity score threshold may indicate that any propensity score above the propensity score threshold is a high likelihood the user account will perform the action.

In some embodiments, and as shown in block 608, the process flow 600 may include the step of implementing propensity score algorithm on the new data segment based on at least determining that the propensity score algorithm meets the objective priority or driver of propensity or progression requirement. For example, the system may implement and/or apply the propensity score algorithm on the new data segment, similar to the process described above with respect to FIG. 3. In this manner, the propensity score algorithm is generated and refined until it has been determined to meet the objective priority(ies), the driver of propensity(ies), the progression requirement(s), and/or the like, and only then may the propensity score algorithm be apply to the new data segment in order to generate the propensity score(s).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for identifying electronic accounts based on near real time machine learning in an electronic network, the system comprising:

a processing device;

a non-transitory storage device containing instructions when executed by the processing device, causes the processing device to perform the steps of:

identify at least one data storage component, wherein at least one data store component comprises data associated with an at least one application;

determine at least one current requirement of the data, wherein the at least one current requirement comprises at least one of an objective priority, a driver of propensity, or a progression requirement;

receive at least one data segment from the data storage component associated with the at least one application;

collect at least one current element from the at least one data segment;

reformat and aggregate the at least one current element and link the at least one current element to a unique entity identifier;

apply a trained machine learning model to the at least one current element;

generate, by the trained machine learning model a new data segment, wherein the new data segment is based on the at least one current element of the new data segment; and generate a propensity score based on at least one of the unique entity identifier, the at least one current element, or the at least one new data segment, wherein the propensity score is in relation to at least one the objective priority, the driver of propensity, or the progression requirement, and wherein the propensity score is based on the at least one data segment associated with the unique entity identifier and the at least one new data segment.

2. The system of claim 1, wherein executing the instructions further causes the processing device to:

access at least one application data repository associated with the at least one application;

retrieve, from the at least one application data repository, at least one archived data segment;

identify, for each archived data segment of the at least one archived data segment, an at least one propensity score algorithm, wherein the at least one propensity score algorithm is used to determine the propensity score for the at least one unique entity identifier; and generate a table of entities, the table of entities comprising the at least one unique entity identifier associated with the propensity score that meets or exceeds a propensity score threshold.

3. The system of claim 2, wherein executing the instructions further causes the processing device to:

generate an output data report based on the table of entities; and apply the output data report to the trained machine learning model.

4. The system of claim 1, wherein executing the instructions further causes the processing device to:

generate an optimization algorithm based on a method of training an untrained machine learning model to generate the trained machine learning model, the method of training the untrained machine learning model comprising:

collecting a set of data segments from the at least one storage component associated with the at least one application;

applying at least one transformation to each data segment of the set of data segments;

creating a first training set comprising the set of data segments associated with at least one of:

a customer event hub, an enterprise event hub, at least one application programming interface, messaging data, or at least one data packet;

training the untrained machine learning model in a first stage using the first training set;

creating a second training set for a second stage of training comprising the first training set and a plurality of propensity scores that are incorrectly above a propensity score threshold after the first stage of training; and training the untrained machine learning model in a second stage using the second training set.

5. The system of claim 4, wherein executing the instructions further causes the processing device to:

receive, for each data segment of the at least one data segment, the optimization algorithm used to optimize an accuracy of the propensity score, wherein the optimization algorithm is determined based on a highest realizable propensity score based on the at least one current requirement.

6. The system of claim 5, wherein executing the instructions further causes the processing device to:

determine the accuracy of the propensity score based on a correctness rate, wherein the correctness rate is based on an output data report using a table of entities with a propensity score above a propensity score threshold.

7. The system of claim 6, wherein executing the instructions further causes the processing device to:

determine that a propensity score meets at least one of the objective priority, the driver of propensity, or the progression requirement associated with the new data segment; and implement a propensity score algorithm on the new data segment based on at least determining that the propensity score algorithm meets the objective priority or driver of propensity or progression requirement.

8. A computer program product for near real time machine learning entity propensity scoring and targeting, the computer program product comprising a non-transitory computer-readable medium comprising code causing an apparatus to:

identify at least one data storage component, wherein at least one data store component comprises data associated with an at least one application;

determine at least one current requirement of the data, wherein the at least one current requirement comprises at least one of an objective priority, a driver of propensity or a progression requirement;

receive at least one data segment from the data storage component associated with the at least one application;

collect at least one current element from the at least one data segment;

reformat and aggregate the at least one current element and link the at least one current element to a unique entity identifier;

apply a trained machine learning model to the at least one current element;

generate, by the trained machine learning model a new data segment, wherein the new data segment is based on the at least one current element of the new data segment; and generate a propensity score based on at least one of the unique entity identifier, the at least one current element, or the at least one new data segment, wherein the propensity score is in relation to at least one the objective priority, the driver of propensity, or the progression requirement, and wherein the propensity score is based on the at least one data segment associated with the unique entity identifier and the at least one new data segment.

9. The computer program product of claim 8, wherein the code further causes the apparatus to:

access at least one application data repository associated with the at least one application;

retrieve, from the at least one application data repository, at least one archived data segment;

identify, for each archived data segment of the at least one archived data segment, an at least one propensity score algorithm, wherein the at least one propensity score algorithm is used to determine the propensity score for the at least one unique entity identifier; and generate a table of entities, the table of entities comprising the at least one unique entity identifier associated with the propensity score that meets or exceeds a propensity score threshold.

10. The computer program product of claim 9, wherein the code further causes the apparatus to:

generate an output data report based on the table of entities; and apply the output data report to the trained machine learning model.

11. The computer program product of claim 8, wherein the code further causes the apparatus to:

generate an optimization algorithm based on a method of training an untrained machine learning model to generate the trained machine learning model, the method of training the untrained machine learning model comprising:

collecting a set of data segments from the at least one storage component associated with the at least one application;

applying at least one transformation to each data segment of the set of data segments;

creating a first training set comprising the set of data segments associated with at least one of:

a customer event hub, an enterprise event hub, at least one application programming interface, messaging data, or at least one data packet;

training the untrained machine learning model in a first stage using the first training set;

creating a second training set for a second stage of training comprising the first training set and a plurality of propensity scores that are incorrectly above a propensity score threshold after the first stage of training; and training the untrained machine learning model in a second stage using the second training set.

12. The computer program product of claim 11, wherein the code further causes the apparatus to:

receive, for each data segment of the at least one data segment, the optimization algorithm used to optimize an accuracy of the propensity score, wherein the optimization algorithm is determined based on a highest realizable propensity score based on the at least one current requirement.

13. The computer program product of claim 12, wherein the code further causes the apparatus to:

determine the accuracy of the propensity score based on a correctness rate, wherein the correctness rate is based on an output data report using a table of entities with a propensity score above a propensity score threshold.

14. The computer program product of claim 13, wherein the code further causes the apparatus to:

determine that a propensity score meets at least one of the objective priority, the driver of propensity, or the progression requirement associated with the new data segment; and implement a propensity score algorithm on the new data segment based on at least determining that the propensity score algorithm meets the objective priority or driver of propensity or progression requirement.

15. A method for near real time machine learning entity propensity scoring and targeting, the method comprising:

identifying at least one data storage component, wherein at least one data store component comprises data associated with an at least one application;

determining at least one current requirement of the data, wherein the at least one current requirement comprises at least one of an objective priority, a driver of propensity or a progression requirement;

receiving at least one data segment from the data storage component associated with the at least one application;

collecting at least one current element from the at least one data segment;

reformatting and aggregate the at least one current element and link the at least one current element to a unique entity identifier;

applying a trained machine learning model to the at least one current element;

generating, by the trained machine learning model a new data segment, wherein the new data segment is based on the at least one current element of the new data segment; and generating a propensity score based on at least one of the unique entity identifier, the at least one current element, or the at least one new data segment, wherein the propensity score is in relation to at least one the objective priority, the driver of propensity, or the progression requirement, and wherein the propensity score is based on the at least one data segment associated with the unique entity identifier and the at least one new data segment.

16. The method of claim 15, wherein the method further comprises:

accessing at least one application data repository associated with the at least one application;

retrieving, from the at least one application data repository, at least one archived data segment;

identifying, for each archived data segment of the at least one archived data segment, an at least one propensity score algorithm, wherein the at least one propensity score algorithm is used to determine the propensity score for the at least one unique entity identifier; and generating a table of entities, the table of entities comprising the at least one unique entity identifier associated with the propensity score that meets or exceeds a propensity score threshold.

17. The method of claim 16, wherein the method further comprises:

generating an output data report based on the table of entities; and applying the output data report to the trained machine learning model.

18. The method of claim 15, wherein the method further comprises:

generating an optimization algorithm based on a method of training an untrained machine learning model to generate the trained machine learning model, the method of training the untrained machine learning model comprising:

collecting a set of data segments from the at least one storage component associated with the at least one application;

applying at least one transformation to each data segment of the set of data segments;

creating a first training set comprising the set of data segments associated with at least one of:

a customer event hub, an enterprise event hub, at least one application programming interface, messaging data, or at least one data packet;

training the untrained machine learning model in a first stage using the first training set;

creating a second training set for a second stage of training comprising the first training set and a plurality of propensity scores that are incorrectly above a propensity score threshold after the first stage of training; and training the untrained machine learning model in a second stage using the second training set.

19. The method of claim 18, wherein the method further comprises:

receiving, for each data segment of the at least one data segment, the optimization algorithm used to optimize an accuracy of the propensity score, wherein the optimization algorithm is determined based on a highest realizable propensity score based on the at least one current requirement.

20. The method of claim 19, wherein the method further comprises:

determining the accuracy of the propensity score based on a correctness rate, wherein the correctness rate is based on an output data report using a table of entities with a propensity score above a propensity score threshold.

* * * * *